United States Patent
Yeakle et al.

(10) Patent No.: US 11,708,007 B2
(45) Date of Patent: Jul. 25, 2023

(54) CONTROL SYSTEMS AND METHODS FOR MODIFYING A BATTERY STATE OF CHARGE SIGNAL

(71) Applicant: FORD GLOBAL TECHNOLOGIES, LLC, Dearborn, MI (US)

(72) Inventors: Kyle Yeakle, Royal Oak, MI (US); Alec Bolthouse, Dearborn, MI (US); Judhajit Roy, Royal Oak, MI (US); Jonathan Barker, Detroit, MI (US); Jared King, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/391,355

(22) Filed: Aug. 2, 2021

(65) Prior Publication Data
US 2023/0031294 A1 Feb. 2, 2023

(51) Int. Cl.
*B60L 58/13* (2019.01)
*B60W 10/08* (2006.01)

(52) U.S. Cl.
CPC ............. *B60L 58/13* (2019.02); *B60W 10/08* (2013.01); *B60L 2240/421* (2013.01); *B60L 2240/423* (2013.01)

(58) Field of Classification Search
CPC ......... B60L 58/12; B60L 58/13; B60W 10/08; B60W 10/26; B60W 10/28; B60W 20/13
See application file for complete search history.

(56) References Cited

U.S. PATENT DOCUMENTS

| | | | | |
|---|---|---|---|---|
| 9,517,703 | B1 * | 12/2016 | Liu | B60H 1/00392 |
| 9,517,705 | B1 * | 12/2016 | Liu | B60L 15/2045 |
| 10,759,298 | B2 * | 9/2020 | Wang | B60L 58/21 |
| 2011/0213517 | A1 * | 9/2011 | Laws | B60L 58/12 180/65.265 |
| 2012/0032637 | A1 * | 2/2012 | Kotooka | B60L 50/61 320/109 |
| 2013/0085631 | A1 * | 4/2013 | Kim | B60L 58/13 701/22 |
| 2013/0204490 | A1 * | 8/2013 | Pfefferl | B60L 3/108 701/36 |
| 2015/0081237 | A1 * | 3/2015 | Ye | B60L 3/12 702/63 |
| 2015/0097512 | A1 * | 4/2015 | Li | B60L 58/13 320/108 |
| 2015/0105948 | A1 * | 4/2015 | Chang | B60L 15/20 701/22 |
| 2015/0120104 | A1 * | 4/2015 | Stefanon | B60W 50/082 180/65.265 |
| 2016/0114786 | A1 * | 4/2016 | Morisaki | B60L 50/16 180/65.265 |

(Continued)

*Primary Examiner* — Jeffrey J Restifo
(74) *Attorney, Agent, or Firm* — David B Kelley; Brooks Kushman P.C.

(57) ABSTRACT

A hybrid vehicle includes an engine, an electric machine, a traction battery electrically connected to the electric machine, and a controller. The controller is programmed to, in response to the vehicle approaching a decline, overrepresent a state of charge (SOC) of the traction battery to cause a torque command to the engine to decrease and a torque command to the electric machine to increase such that discharge of the traction battery increases in advance of the decline.

19 Claims, 3 Drawing Sheets

(56) References Cited

U.S. PATENT DOCUMENTS

| | | | |
|---|---|---|---|
| 2016/0152152 A1* | 6/2016 | Gaither | B60L 50/15 701/22 |
| 2016/0167641 A1* | 6/2016 | Yoon | G08G 1/09623 903/903 |
| 2016/0176309 A1* | 6/2016 | Jeon | B60L 58/12 701/22 |
| 2016/0243947 A1* | 8/2016 | Perkins | B60L 53/14 |
| 2016/0243958 A1* | 8/2016 | Miller | B60L 7/26 |
| 2016/0339903 A1* | 11/2016 | Hokoi | B60W 20/13 |
| 2016/0375782 A1* | 12/2016 | Liu | B60L 58/12 320/109 |
| 2016/0375785 A1* | 12/2016 | Liu | B60L 15/20 701/22 |
| 2016/0375786 A1* | 12/2016 | Liu | B60W 30/188 701/22 |
| 2016/0375787 A1* | 12/2016 | Liu | B60L 58/12 701/22 |
| 2018/0273021 A1* | 9/2018 | Morimoto | B60W 10/26 |
| 2019/0168737 A1* | 6/2019 | Takahashi | B60L 50/15 |
| 2019/0202299 A1* | 7/2019 | Oh | H01M 10/44 |
| 2019/0232815 A1* | 8/2019 | Hokoi | B60W 10/08 |
| 2019/0329758 A1* | 10/2019 | Takahashi | B60W 20/13 |
| 2020/0391721 A1* | 12/2020 | Wang | B60W 10/06 |
| 2021/0116927 A1* | 4/2021 | Kang | G01C 21/3492 |
| 2021/0215493 A1* | 7/2021 | Kapadia | G01C 21/3697 |
| 2021/0252983 A1* | 8/2021 | Nahrwold | B60L 58/12 |
| 2021/0281101 A1* | 9/2021 | Lee | B60W 10/02 |
| 2022/0050143 A1* | 2/2022 | Maeda | B60L 53/305 |
| 2022/0266675 A1* | 8/2022 | Healy | B60K 6/48 |
| 2022/0305953 A1* | 9/2022 | Kamiya | B60L 50/60 |
| 2022/0332194 A1* | 10/2022 | Lindberg | B60L 7/26 |
| 2023/0001822 A1* | 1/2023 | Huang | B60L 58/13 |
| 2023/0027461 A1* | 1/2023 | Harada | B60W 10/06 |
| 2023/0031294 A1* | 2/2023 | Yeakle | B60W 10/08 |
| 2023/0075768 A1* | 3/2023 | Kitagawa | B60L 58/13 |

\* cited by examiner

CONTROL SYSTEMS AND METHODS FOR MODIFYING A BATTERY STATE OF CHARGE SIGNAL

TECHNICAL FIELD

This application generally relates to energy management for hybrid vehicles.

BACKGROUND

A hybrid-electric vehicle includes a traction battery constructed of multiple battery cells in series and/or parallel. The traction battery provides power for vehicle propulsion and accessory features. During operation, the traction battery may be charged or discharged based on the operating conditions including a battery state of charge (BSOC), driver demand and regenerative braking.

SUMMARY

According to one embodiment, a hybrid vehicle includes an engine, an electric machine, a traction battery electrically connected to the electric machine, and a controller. The controller is programmed to, responsive to a state of charge (SOC) of the traction battery having a first value and indication that an approaching road segment is a level grade, command torques to the engine and electric machine that result in charging of the traction battery, responsive to the SOC having a second value greater than the first value and indication that an approaching road segment is a level grade, command torques to the engine and electric machine that result in discharging of the traction battery, and responsive to the SOC having the first value and indication that an approaching road segment is a downhill grade, command torques to the engine and electric machine that result in discharging of the traction battery in advance of the downhill grade.

According to another embodiment, a hybrid vehicle includes an engine, an electric machine, a traction battery electrically connected to the electric machine, and a controller. The controller is programmed to, in response to the vehicle approaching a decline, overrepresent a state of charge (SOC) of the traction battery to cause a torque command to the engine to decrease and a torque command to the electric machine to increase such that discharge of the traction battery increases in advance of the decline.

A method of controlling battery usage in a hybrid vehicle including, while a state of charge (SOC) of a traction battery has a first value and indication that an approaching road segment is a level grade, commanding torques to an engine and an electric machine that result in charging of the traction battery. The method further including, while the SOC has a second value greater than the first value and indication that an approaching road segment is a level grade, commanding torques to the engine and electric machine that result in discharging of the traction battery and, while the SOC has the first value and indication that an approaching road segment is a downhill grade, commanding torques to the engine and electric machine that result in discharging of the traction battery in advance of the downhill grade.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
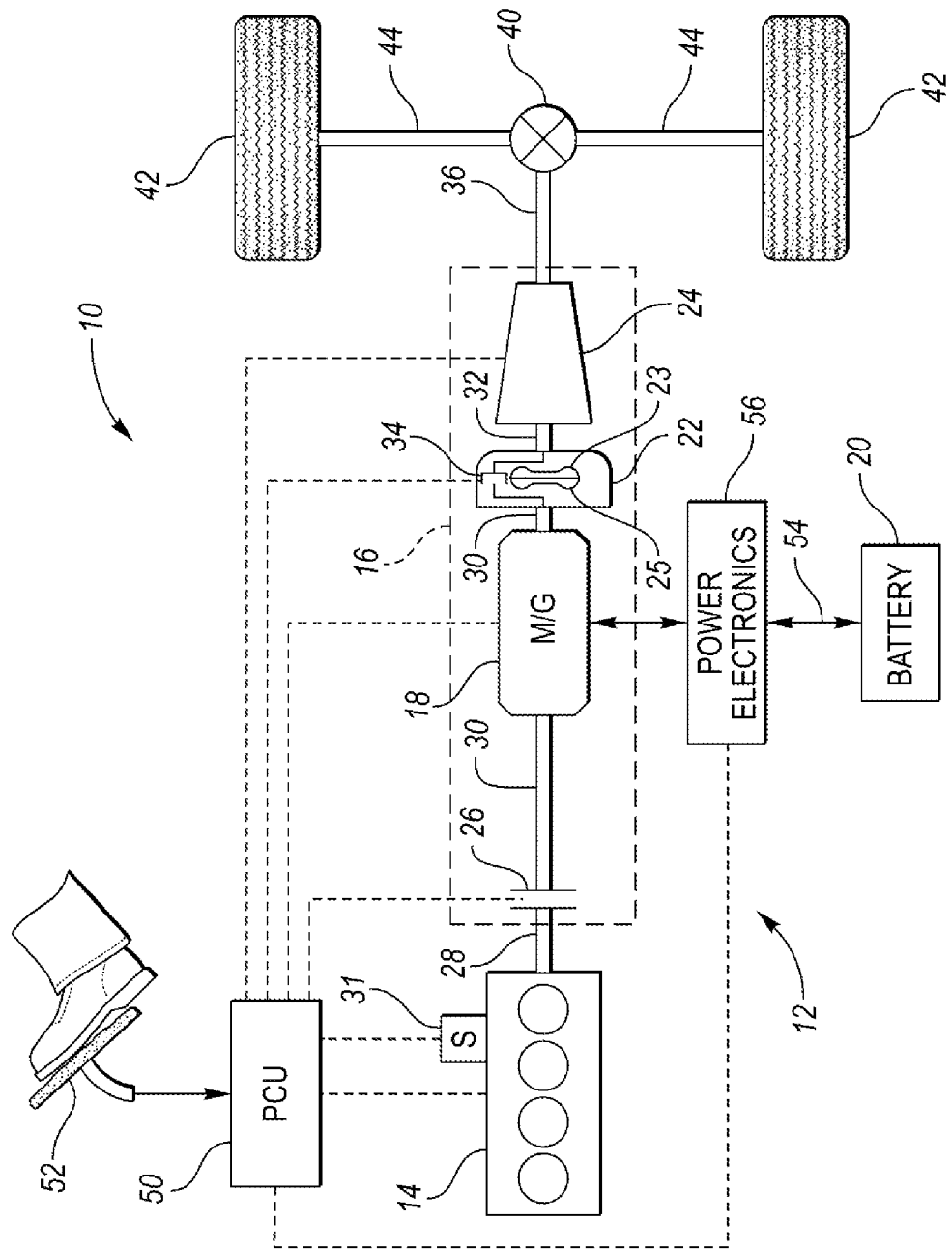
FIG. 1 is a schematic of a hybrid electric vehicle according to one embodiment.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 25 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
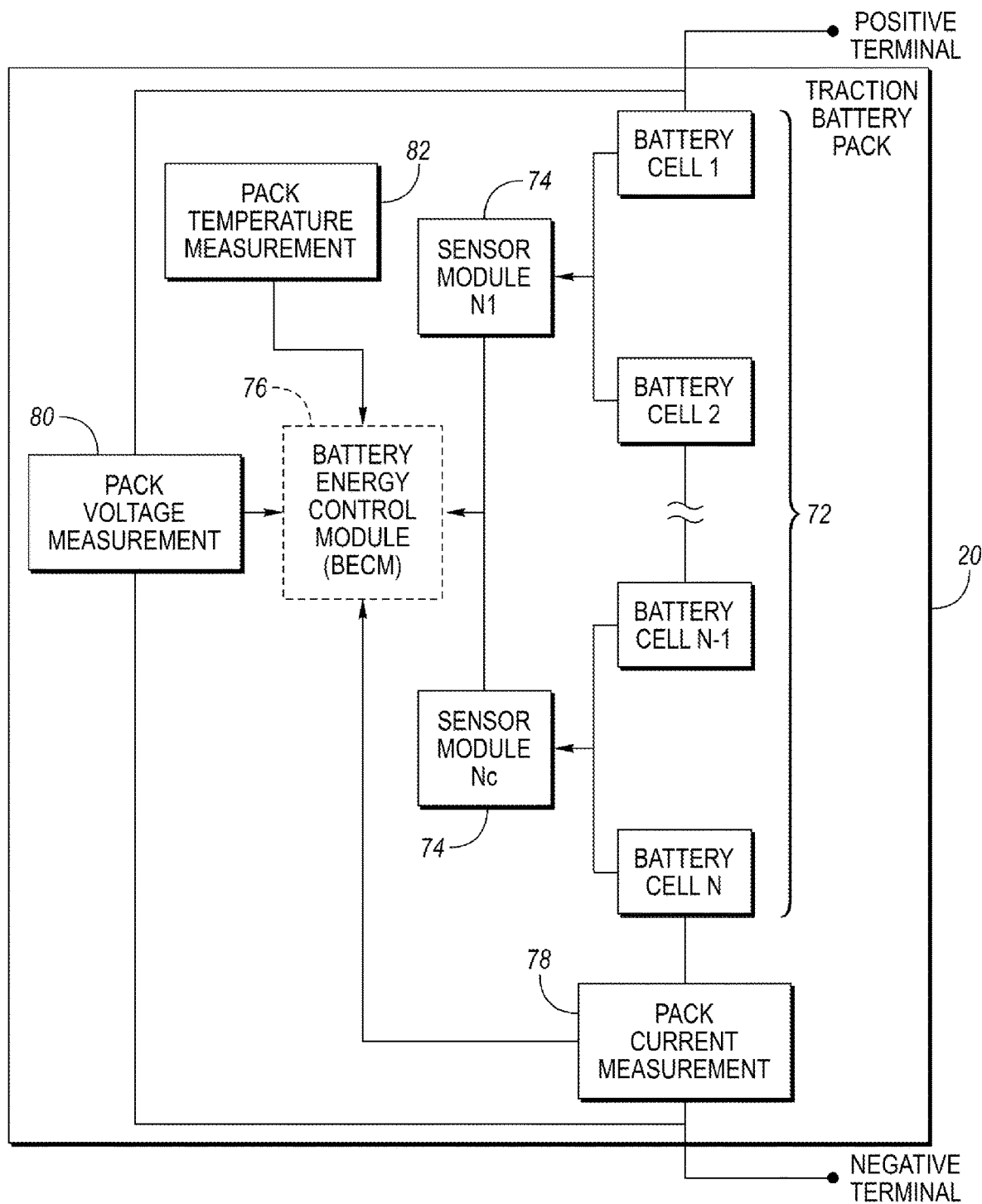
FIG. 2 is an exemplary diagram of a battery pack controlled by a Battery Energy Control Module.

The traction battery 20 may be constructed from a variety of chemical formulations. Typical battery pack chemistries may be lead acid, nickel-metal hydride (NIMH) or Lithium-Ion. FIG. 2 shows a typical traction battery pack 20 in a series configuration of N battery cells 72. Other battery packs 20, however, may be composed of any number of individual battery cells connected in series or parallel or some combination thereof. A battery management system may have a one or more controllers, such as a Battery Energy Control Module (BECM) 76 that monitors and controls the performance of the traction battery 20. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell level characteristics that are measured and monitored. For example, the terminal voltage, current, and temperature of each cell 72 may be measured. The battery management system may use a sensor module 74 to measure the battery cell characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module hardware may be integrated as part of the circuitry in the BECM 76 and the BECM 76 may handle the processing of raw signals.

The BECM 76 may include circuitry to interface with the one or more contactors. The positive and negative terminals of the traction battery 20 may be protected by contactors.

Battery state of charge (SOC) gives an indication of how much charge remains in the battery cells 72 or the battery pack 20. The battery pack SOC may be output to inform the driver of how much charge remains in the battery pack 20, similar to a fuel gauge. The battery pack SOC may also be used to control the operation of an electric or hybrid-electric vehicle 10. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to provide the SOC estimate, which may also be referred to as calculated SOC or actual SOC.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

When operating the vehicle, actively modifying the way battery SOC is managed can yield higher fuel economy or longer EV-mode (electric propulsion) operation, or both. The vehicle controller must conduct these modifications at both high SOC and low SOC. At low SOC, the controller can consult available data and decide to increase SOC via opportunistic engine-charging (opportunistic means to do this if the engine is already running). This is done to provide longer EV-mode operation when the engine turns off. Conversely, at high SOC, the controller can consult available data to reduce SOC via EV-mode propulsion, reduced engine output, or auxiliary electrical loads. This is done to provide higher battery capacity to maximize energy capture during an anticipated regenerative braking event, such as a high-speed deceleration or hill descent.

The vehicle is configured to receive a plethora of different data from onboard sensors as well as external sources. The data may include GPS data, map data, traffic data, weather data, and many others. The vehicle may include both hardware and software modules to enable use of this data. For example, the vehicle may include a routing engine, a GPS module, and a map and navigation module. These modules are configured to send and receive signals between one another in order to accomplish select functionalities of the vehicle. The vehicle may also include a vision system having a plurality of sensors that inspect an area surrounding the vehicle. The vision system may employ radar, LIDAR, cameras, ultrasound, or sonar, and any combination thereof.

The map data may include information such as road grade and speed limits for segments of the road. Road grade refers to slope or change in elevation, i.e., the angle between the road and earth's horizontal plane. The road grade may be expressed as a percentage or decimal. The road grade may be inclined, e.g., uphill, or declined, e.g., downhill. An uphill grade may be expressed as a positive percentage and a downhill grade may be expressed as a negative percentage.

During operation of the vehicle, the controller determines a target SOC and controls torque commands to the engine and the electric machine to track that target. For example, the controller may determine a difference between the target SOC and the actual SOC and operate the powertrain to reduce the difference. Knowing the elevation profile of a vehicle route, for example, allows the controller to optimize charging and discharging of the battery. For example, the controller can promote charging of the battery as the vehicle approaches a hill so that the electric machine may aid the engine in climbing the hill, conversely, the controller can promote discharging of the battery as the vehicle approaches a downhill so that the vehicle can maximize regenerative braking. One way to encourage charging and discharging of the battery is to artificially inflate or deflate the value of the BSOC sent to the torque arbitration and battery energy management logic. This may be done by adding an SOC offset to the calculated SOC, which is an actual and accurate representation of the BSOC, to generate an artificially high or low value. An artificially high value may be used to promote discharging of the battery and reduce engine torque and an artificially low value may be used to promote charging the battery and increased engine torque.

Figure 3:
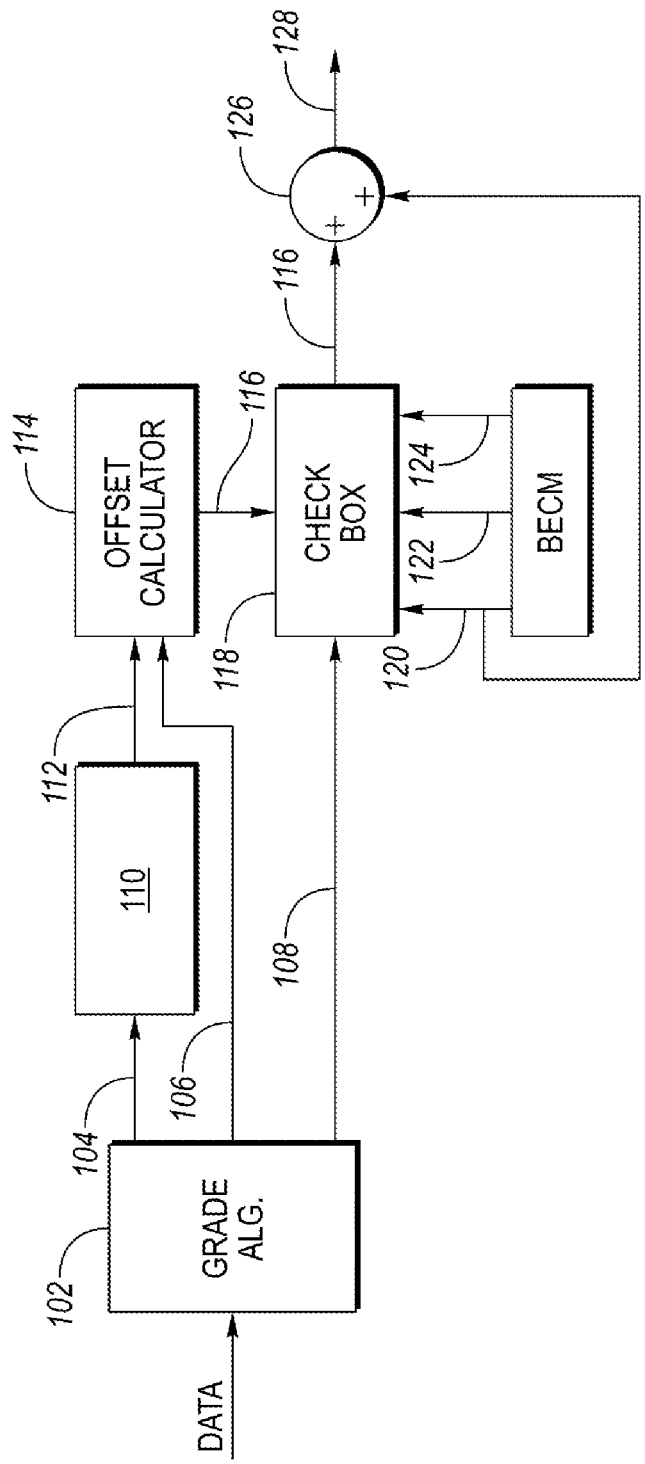
FIG. 3 is a control diagram of an algorithm for artificially increasing or decreasing the BSOC signal sent to one or more control modules.

FIG. 3 illustrates controls 100 configured to artificially increase or decrease the BSOC sent to one or more of control processes, e.g., the control processes associated with charging the battery and arbitrating torque split between the engine and the electric machine. Control box 102 represents a grade algorithm that uses received GPS data, map data and the like to determine grade characteristics of upcoming road segments. If the driver is using navigation, a preplanned route is generated between the vehicle's current position and the end destination. In this case, the controller knows in advance which roads the vehicle will encounter during the trip. This collection of roads may be referred to as a path. The grade algorithm receives road grade for the path. For example, the grade algorithm 102 may receive road grade values for select points along the path. The controls may average or interpolate between these data points. If the driver is not using navigation, the controller may anticipate a likely future path of the vehicle and to pull or receive road grade date for this anticipated path. The grade algorithm 102 may output a grade horizon 104, which is the distance between the vehicle to the next grade event. A grade event may be a substantial change in road grade. For example, if the vehicle is currently traveling on flat ground and the map data indicates a 1% grade 800 meters (m) in front of the vehicle, then the grade horizon 104 would be 800 m. The grade algorithm 102 may also output an average grade 106 of the next grade event. The grade algorithm 102 may also output a confidence rating 108 associated with the average grade 106. The confidence rating 108 may be a value between zero and one and increases as the confidence increases. For example, if the driver is utilizing navigation, the confidence rating may be high as the vehicle knows where it is going well in advance. Alternatively, if the vehicle is unsure of the vehicle's path, the confidence rating may be lower.

Control box 110 receives the grade horizon 104 and calculates a multiplier 112. The multiplier 112 is based on the vehicle speed and the distance of the grade horizon 104. The multiplier may be determined using a two-dimensional lookup table.

Control box 114 is configured to calculate an SOC offset based on the multiplier 112 and the average grade 106. Within control box 114, a one-dimensional lookup table may be used to determine a preliminary SOC offset based on the average grade 106. This preliminary offset may then be modified based on the multiplier to determine the SOC offset 116. For example, the SOC offset 116 may be equal to the preliminary offset multiplied by the multiplier 112. The multiplier 112 is used to modify the SOC offset based on the distance to the grade event. For example, the multiplier 112 may be gradually reduced as the vehicle approaches the next grade event. The offset 116 may be a positive number or a negative number. For example, the SOC offset may have a negative number to encourage battery charging or may have a positive number to encourage battery discharging. Within the context of road grade, the SOC offset 116 may be set to a negative value when the vehicle is approaching an incline, e.g., uphill, and may be set to a positive value when the vehicle is approaching a decline, e.g., downhill.

The SOC offset 116 is fed to a checkbox 118 that either passes through the offset 116 or reduces it to zero based on sensed conditions. The checkbox 118 receives a calculated BSOC 120, which is an accurate estimate of the SOC of the battery, a maximum BSOC limit 122, and a minimum BSOC limit 124.

For example, the checkbox 118 sets the SOC offset 116 to zero if the calculated BSOC 120 is less than a minimum threshold (limit 124) or greater than a maximum threshold (limit 122). The checkbox 118 also sets the offset 116 to zero if the confidence rating is less than a threshold. If neither of these conditions are present, the checkbox passes the SOC offset 116 through. Summation box 126 receives the calculated BSOC 120 and the SOC offset 116. Within box 126, the SOC offset 116 is added (or subtracted) to the calculated BSOC 120 to determine a modified or artificial BSOC 128, that is artificially inflated or deflated to encourage charging or discharging as desired.

The modified BSOC 128 may be sent to select modules of the powertrain control module. For example, the modified BSOC 128 may be sent to the torque-arbitration module that is responsible for determining the torque split between the engine and the electric machines. The modified BSOC 128 may also be sent to the engine start-stop module that is responsible for pulling the engine up and down. The modified BSOC may also be used to adjust shift-schedule logic.

In the example controls 100, the offset was adjusted using only road grade, but controls may use other upcoming events to modify the offset. For example, alternatively or in combination with road grade, the controller may utilize speed-limit data to adjust the value of the SOC offset 116. The speed limit data can be interpreted to determine road sections in which the vehicle will be accelerating or decelerating. Utilizing this information, the modified SOC can be used to encourage charging before a segment of road having an increased speed limit and to discourage discharging before a segment of road having a decreased speed limit. Other data that may be utilized includes stop signs and stoplights, or any other data that indicates definitive acceleration or deceleration of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A hybrid vehicle comprising:
    an engine;
    an electric machine;
    a traction battery electrically connected to the electric machine; and
    a controller programmed to
        responsive to a state of charge (SOC) of the traction battery having a first value and indication that an approaching road segment is a level grade, command torques to the engine and electric machine that result in charging of the traction battery, responsive to the SOC having a second value greater than the first value and indication that an approaching road segment is a level grade, command torques to the engine and electric machine that result in discharging of the traction battery, and responsive to the SOC having the first value and indication that an approaching road segment is a downhill grade, command torques to the engine and electric machine that result in discharging of the traction battery in advance of the downhill grade.

2. The hybrid vehicle of claim 1, wherein the controller is further programmed to responsive to the SOC having the second value and indication that an approaching road segment is a downhill grade, command torques to the engine and electric machine that result in discharging of the traction battery in advance of the downhill grade.

3. The hybrid vehicle of claim 1, wherein the controller is further programmed to responsive to the SOC having a third value less than the first value and indication that an approaching road segment is a downhill grade, command torques to the engine and electric machine that result in charging of the traction battery in advance of the downhill grade.

4. The hybrid vehicle of claim 1, wherein the first value is less than 30 percent.

5. The hybrid vehicle of claim 1, wherein the controller is further programmed to responsive to the SOC having a third value greater than the first value and indication that an approaching road segment is a level grade, command torques to the engine and electric machine that result in discharging of the traction battery, responsive to the SOC having a fourth value less than the third value and indication that an approaching road segment is a level grade, command torques to the engine and electric machine that result in charging of the traction battery, and responsive to the SOC having the third value and indication that an approaching road segment is an uphill grade, command torques to the engine and electric machine that result in charging of the traction battery in advance of the uphill grade.

6. The hybrid vehicle of claim 5, wherein the third value is greater than 60 percent.

7. The hybrid vehicle of claim 5, wherein the controller is further programmed to responsive to the SOC having the fourth value and indication that an approaching road segment is an uphill grade, command torques to the engine and electric machine that result in charging of the traction battery in advance of the downhill grade.

8. The hybrid vehicle of claim 1, wherein the torques commanded to the engine and the electric machine that result in charging of the traction battery in advance of the downhill grade are based on a distance between the vehicle and the downhill grade.

9. A hybrid vehicle comprising:
an engine;
an electric machine;
a traction battery electrically connected to the electric machine; and
a controller programmed to, in response to the vehicle approaching a decline, overrepresent a state of charge (SOC) of the traction battery to cause a torque command to the engine to decrease and a torque command to the electric machine to increase such that discharge of the traction battery increases in advance of the decline.

10. The hybrid vehicle of claim 9, wherein the overrepresented SOC is derived from a calculated SOC plus and an offset that is based on presence of the decline.

11. The hybrid vehicle of claim 10, wherein the offset is further based on a speed of the vehicle.

12. The hybrid vehicle of claim 11, wherein the offset if further based on a distance between the vehicle and the decline.

13. The hybrid vehicle of claim 10, wherein the offset is zero responsive to the calculated SOC being greater than an upper threshold or lower than a lower threshold.

14. The hybrid vehicle of claim 9, wherein the controller is further programmed to overrepresent the SOC in response to an actual SOC being less than an upper threshold or greater than a lower threshold.

15. The hybrid vehicle of claim 9, wherein the controller is further programmed to overrepresent the SOC in response to a confidence rating, associated with the decline, exceeding a threshold.

16. A method of controlling battery usage in a hybrid vehicle comprising:
while a state of charge (SOC) of a traction battery has a first value and indication that an approaching road segment is a level grade, commanding torques to an engine and an electric machine that result in charging of the traction battery;
while the SOC has a second value greater than the first value and indication that an approaching road segment is a level grade, commanding torques to the engine and electric machine that result in discharging of the traction battery; and
while the SOC has the first value and indication that an approaching road segment is a downhill grade, commanding torques to the engine and electric machine that result in discharging of the traction battery in advance of the downhill grade.

17. The method of claim 16 further comprising:
while the SOC of the traction battery has a third value that is greater than the first value and indication that an approaching road segment is a level grade, commanding torques to the engine and electric machine that result in discharging of the traction battery;
while the SOC has a fourth value less than the third value and indication that an approaching road segment is a level grade, commanding torques to the engine and electric machine that result in charging of the traction battery; and
while the SOC has the third value and indication that an approaching road segment is an uphill grade, commanding torques to the engine and electric machine that result in charging of the traction battery in advance of the uphill grade.

18. The method of claim 16 further comprising:
while the SOC has the second value and indication that an approaching road segment is a downhill grade, commanding torques to the engine and electric machine that result in discharging of the traction battery in advance of the downhill grade.

19. The method of claim 16 further comprising:
while the SOC has a third second value less than the first value and indication that an approaching road segment is a downhill grade, commanding torques to the engine and electric machine that result in charging of the traction battery in advance of the downhill grade.

\* \* \* \* \*